Figure 4:
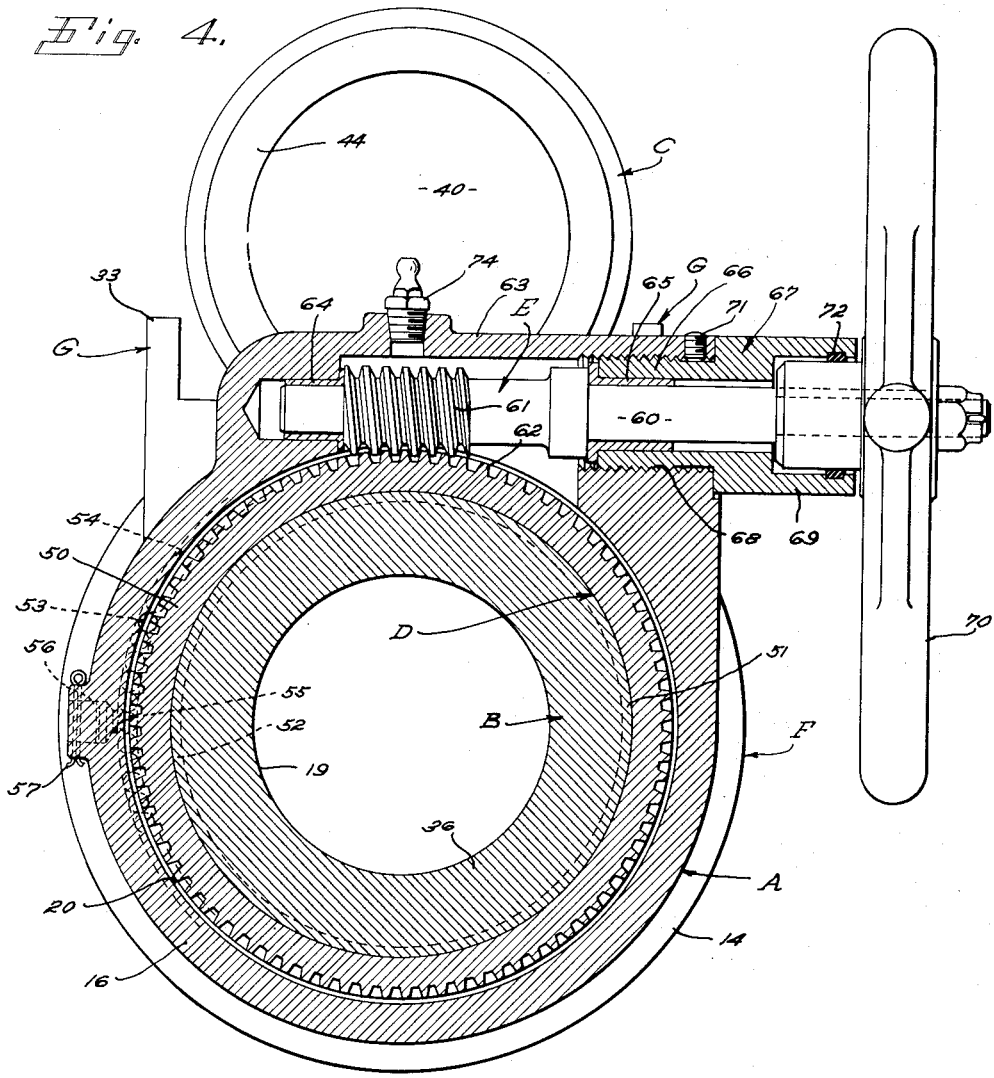

Jan. 5, 1954
L. S. HAMER
2,664,918
LINE BLIND CONSTRUCTION
Filed March 1, 1948
3 Sheets-Sheet 1
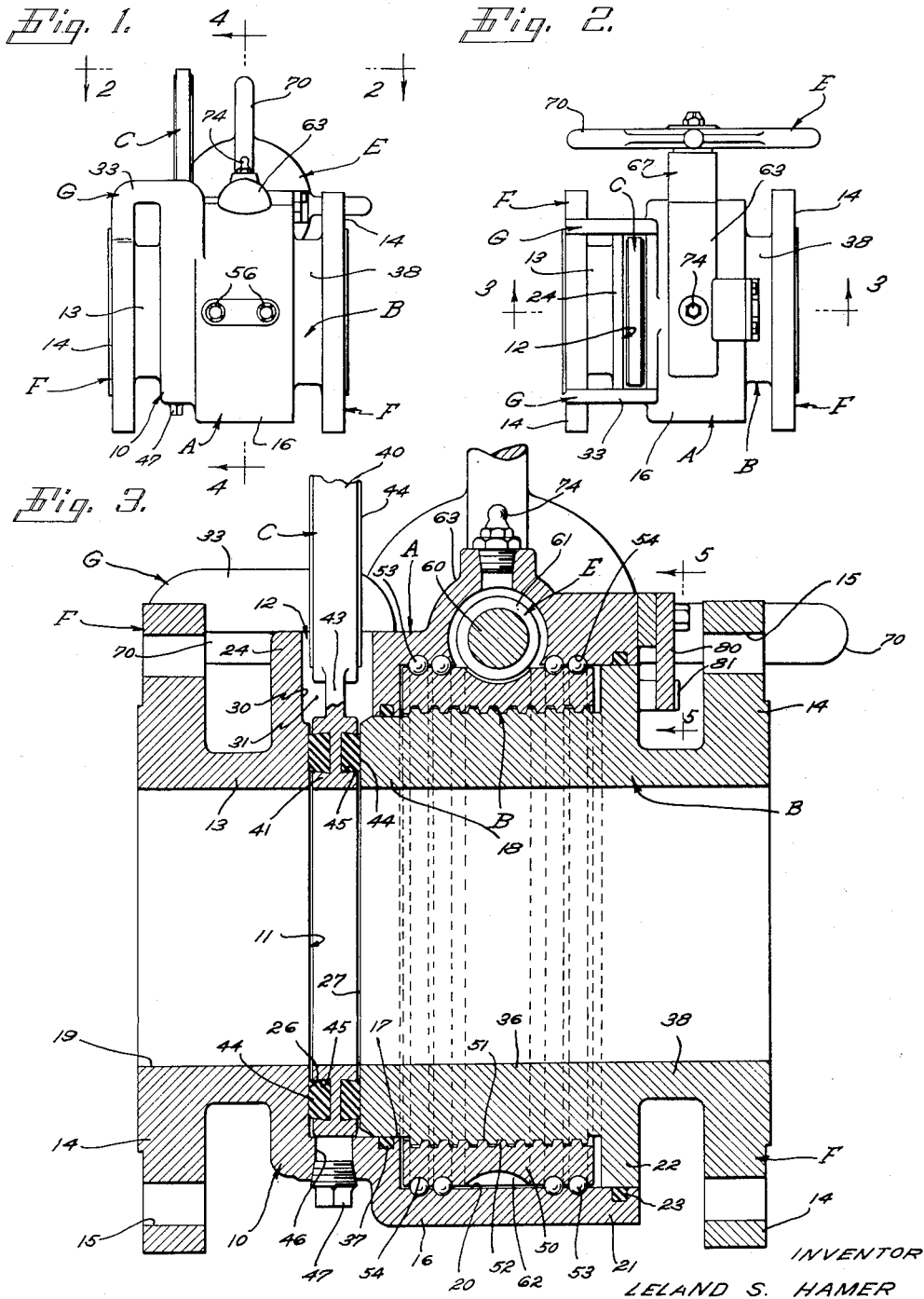
INVENTOR
LELAND S. HAMER
BY
ATTORNEY Jan. 5, 1954  L. S. HAMER  2,664,918
LINE BLIND CONSTRUCTION
Filed March 1, 1948  3 Sheets-Sheet 2

INVENTOR
LELAND S. HAMER
BY
ATTORNEY

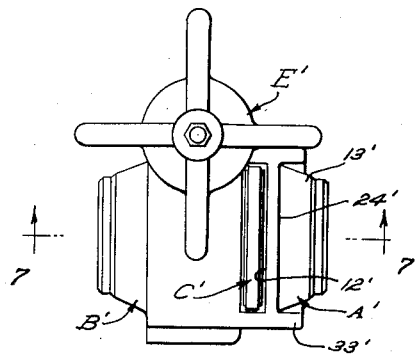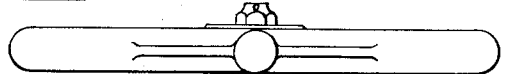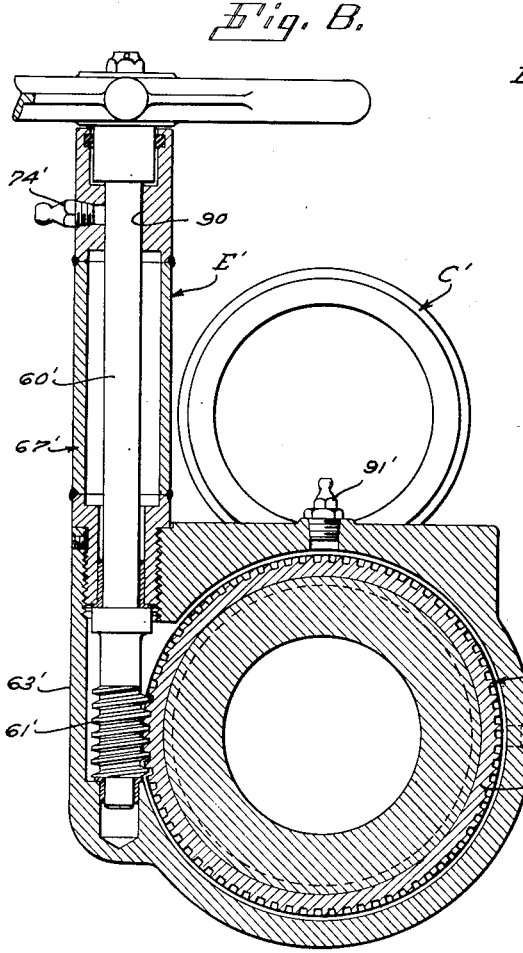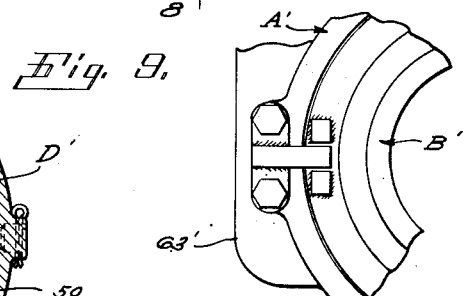

Patented Jan. 5, 1954

2,664,918

UNITED STATES PATENT OFFICE 2,664,918

LINE BLIND CONSTRUCTION

Leland S. Hamer, Long Beach, Calif., assignor of one-fourth to Paul A. Dewhirst, Los Angeles, Calif.

Application March 1, 1948, Serial No. 12,457

1 Claim. (Cl. 138—94.3)

This invention is concerned with features of construction in a line blind or flow control fitting and it is a general object of the invention to provide various improved simplified and effective constructions for such fittings.

Line blinds or blinding devices are used extensively in various situations but mainly where it is desired to effect full or positive shut-off such as is difficult, if not impossible, to obtain with an ordinary valve. Such line blinds are frequently installed in situations where it is necessary or desirable that they be operable from a point somewhat offset or removed from the fitting itself and they are often used where pressures are high and they are of such size that the stresses and strains set up in them tend to deflect or distort essential parts of the structure. In the case of a large structure under high pressures the distortion or flexure may be such as to shift or deflect the pipe line sections to which the structure is connected and when this occurs other equipment in the line may be affected.

It is a general object of the present invention to provide a line blind construction wherein telescoping sections clamp a plate and are shifted relative to each other by a screw member operated by means of a gear provided with an operating stem that projects a substantial distance from the sections and which may be such as to project to any desired point relative to the sections.

Another object of the invention is to provide a simple, practical, improved general arrangement of parts in a fitting of the general character referred to whereby the structure is simple of manufacture and is easily assembled.

A further object of the invention is to provide a structure of the general character referred to wherein an annular member is engaged between the telescoping sections that clamp the plate and has threaded engagement with one section and is rotatably engaged with the other section through anti-friction means, all with the result that the structure is compact, simple, and easily operated.

Another object of the present invention is to provide a fitting of the general character referred to involving a body section with coupling means at its outer end to be connected with a pipe, or the like, and provided with a transverse chamber to receive a plate and a lateral opening passing the plate into and out of the chamber and equipped with or including tie members that brace or reinforce the body in the region of the lateral passage in a manner to prevent spreading or deflection of the body under working conditions.

Figure 5:
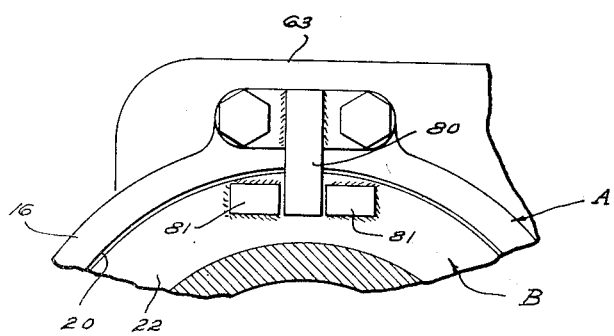

The various objects and features of my invention will be fully understood from the following detailed description of typical preferred forms and applications of the invention, throughout which description reference is made to the accompanying drawings, in which:

Fig. 1 is a side elevation of a fitting embodying the present invention. Fig. 2 is a top or plan view of the structure taken on line 2—2 on Fig. 1. Fig. 3 is an enlarged longitudinal sectional view of the structure taken on line 3—3 on Fig. 2. Fig. 4 is an enlarged transverse sectional view of the structure being a view taken as indicated by line 4—4 on Fig. 1. Fig. 5 is a detailed view taken as indicated by line 5—5 on Fig. 3. Fig. 6 is a longitudinal sectional view of another form of construction. Fig. 7 is a plan view taken as indicated by line 7—7 on Fig. 6. Fig. 8 is a transverse sectional view taken as indicated by line 8—8 on Fig. 6, and Fig. 9 is a detailed view of the structure used to prevent relative rotation between the body and clamp sections employed in the construction shown in Figs. 6 to 8, inclusive.

The structure provided by the present invention is such that it may be embodied in various forms and for purpose of example two typical embodiments are herewith set forth. In the form of the invention shown in Figs. 1 to 5 of the drawings a form of construction is disclosed wherein coupling means or pipe connections at the ends of the body sections are shown in the form of flanges, while the operating stem is shown projecting tangentially from the body structure and is horizontally disposed to extend from one side of the structure. In the form of the invention shown in Figs. 6 to 9, inclusive, the coupling or connecting means at the outer ends of the body sections are shown such as to have pipes joined thereto by welding and the operating member or stem projects tangentially from the body and upwardly therefrom rather than to one side thereof.

Referring to the form of the invention illustrated in Figs. 1 to 5, the structure involves, generally, two telescopically related sections, one of which I will refer to as a body section A and the other a clamp section B. A plate C is carried by and engaged between the sections A and B and a means D is provided for operating the sections A and B relative to each other. The structure includes actuating means E for the means D and connecting means F at the outer ends of the sections A and B for making connection with pipes, or the like. In accordance with the present invention ties G extend between and couple the connecting means F on the outer end of body section A with the middle portion of body section A to extend between opposite sides of the passage provided in body section A for passing the plate C into and out of operating position.

The body section A is preferably a unitary part, for example, a casting, and in the preferred form of the invention it involves, generally, a main part with a well portion 10 forming or providing a transversely disposed plate receiving chamber 11 and an upwardly opening passage 12 communicating with the chamber 11 for passing the plate C into and out of operating position. The outer end portion 13 of body section A joins to and projects outward from one side of the well portion 10 and carries the means F that occurs at the outer end of section A.

In the particular case illustrated the means F at the outer end of section A is a flange 14 formed on or joined to the end portion 13. The flange is preferably such as to make a standard flange connection with a pipe, or the like, and it is provided with a plurality of bolt openings 15 in the manner common to connecting flanges of this character.

At the other or inner side of the well portion 10 the main part of the body has a tubular middle portion 16 considerably larger in diameter than the end portion 13 and provided with a round opening or bore 17 that slidably passes the inner end portion 18 of the section B. The opening is preferably round and concentric with the opening 19 that occurs through the flange 14 and end portion 13 of the body. An enlarged opening or counterbore 20 enters the body A from its inner end portion 21 and carries or accommodates the means D, as will be hereinafter described. In the particular form of construction illustrated an enlarged portion or flange 22 on the clamp section B is slidably engaged in the inner end portion 21 of body A and a sealing ring 23 engages between these parts.

The well portion 10 of body A defines or forms the chamber 11 into which the plate C may be entered, as shown throughout the drawings, and a vertical extension 24 of the well portion defines the upwardly opening passage 12 through which the plate is admitted into the chamber 11. It will be observed from the drawings that the chamber 11 is of limited extent axially of the structure, being only wide enough to readily accommodate the plate which is a thin member, but it is of considerable extent transverse of the structure to accommodate the plate so that marginal portions thereof are located to be clamped between the wall 26 of the chamber 11 and the end 27 of the clamp section B.

The passage 12 through which the plate is entered into the chamber 11 is likewise narrow or of limited extent axially but is wide or of substantial extent transversely of the structure in order to adequately accommodate or pass the plate. The extension 24 of the body portion 10 that defines the passage 11 has vertical sides 30 which are flat and extend transversely of the structure, and it has vertical ends 31 which join or extend between the vertical edges of the sides 30.

In accordance with my invention the structure above described is provided with ties G that join the flange 14 of means F with the body at a substantial distance inward of the flange and preferably at the middle portion 16 of the body, although it may in some instances be practical to join the ties merely to the extension 30 of the well portion of the body.

In practice I employ two ties G, one joined to each end portion of the well extension 24 and extending to and joined with the middle portion 16 of body A. Each tie is preferably an elongate bar-like part 33 and has its outer end integrally joined with the flange 14 while its inner end is integrally joined with the part 24 of the body portion 16. In the particular case illustrated the bar-like parts 33 forming the ties are joined to the upper ends or edges of the ends 31 of portion 24 and are spaced far enough apart horizontally, as shown in Fig. 2, so that they do not in any way interfere with free passage of the plate into and out of the chamber 11. By extending the bars 33 from the flange 14 to the middle portion of the body A or to a part of the body A at the side of passage 12 remote from the flange 14, the flange at the portion or region opposite the passage 12 is tied or anchored to the middle portion of the body so that pressure that would otherwise tend to spread the passage is resisted and, in practice, little or no spreading or deflection occurs in the body, that is, of the flange relative to the middle portion of the body.

The clamp section B has a main or middle portion 36 that carries the flange 22 and which extends through the counterbore 20 with substantial clearance so that the inner end portion 18 of section B which is joined to and is a continuation of the portion 36 enters the opening 17. In the preferred form of the invention a sealing ring 37 is provided between the body and the clamp section B where the end portion 18 passes through or enters the opening 17. The outer end portion 38 of the clamp section B projects beyond the inner end portion 21 of section A and it carries a unit of connecting means F which in this case is a flange 14 suitable for making a flanged connection with a pipe, or the like. It is to be observed that the flange 14 is located far enough away from the flange 22 to enable nuts to be introduced between the flanges in the course of connecting the structure with a pipe flange.

The plate C may, in accordance with my present invention, be of any suitable form or type. In the drawings I have shown a plate such as is commonly used in fittings of this general character. The plate has two ends or plate portions, one a solid end 40 which completely closes off flow through the fitting when it is in operating position, and the other an apertured end 41 which in no way interferes with flow through the fitting when in operating position. The ends 40 and 41 of the plate are joined by a suitable neck or connection 43.

In practice it is desirable to provide means for sealing the ends of the plate between the sections A and B. In the case illustrated annular packing rings 44 are provided for this purpose, the rings being shown carried in annular grooves 45 in the opposite sides of the plate portions 40 and 41 so that they engage at faces 26 and 27 as clearly illustrated in Fig. 3 of the drawings.

In the preferred construction a drain opening 46 is provided in the lowermost part of the well portion 10 and in practice the opening is normally closed by a removable plug 47.

The means D provided for operating the sections A and B relative to each other serves to move the sections relative to each other in an axial direction or longitudinally of the structure so that the ends or faces 26 and 27 are moved into clamping engagement with the plate or are separated therefrom, freeing the plate for removal or operation through the passage 12.

The means D is preferably a screw means and in the form of the invention illustrated it involves an annular member 50 surrounding the main or middle portion 36 of section B and confined in the counterbore 20 provided in section A. The member 50 has threaded engagement with the exterior of the portion 36, there being threads 51 on the exterior of part 36 meshing with threads 52 on the interior of member 50. The member 50 is rotatable within the counterbore 20 and is confined in the counterbore against axial movement therein but is free to rotate. In the preferred form of the invention, as shown in the drawings, a plurality of rows of balls 53 is engaged between the counterbore and the exterior of the member 50, being carried in suitably shaped grooves 54 provided in these parts. The balls which may be introduced into operating position through side openings 55 in the body section A effectively support the member 50 within the counterbore so that it is free to rotate but is positively held against axial movement. In the case illustrated the opening 55 is normally closed by a plug 56 which may be held in position by a key 57.

The actuating means E provided for operating or turning the member 50 is characterized by an operating stem 60 carried by the body section A to project therefrom and a gear 61 on the stem 60 meshing with and driving the member 50 through teeth 62 provided on the exterior of the member 50. In the case illustrated a suitable boss 63 is provided on the exterior of the middle portion 16 of body section A, which boss is provided with or carries bearings 64 and 65 which rotatably support the stem 60 so that the stem is disposed tangentially of the structure. The gear member 61 is shown as a worm gear fixed on the inner end portion of the stem 60 to have proper driving engagement with the teeth 62 on the member 50. In the particular case illustrated the bearing 64 is mounted directly in boss 63 whereas bearing 65 is mounted in the end portion 66 of a tubular extension 67. The end portion 66 is threaded into an opening 68 in the boss 63 and the outer end portion 69 of the extension may extend or project any suitable distance from the body section A. The stem 60 may extend any suitable distance from the parts above described, it being preferred that it be extended to project from the extension 67 so that it can be conveniently operated by any suitable means. In the case illustrated an operating member is shown mounted on the outer end of stem 60, which member involves or includes a plurality of projecting arms or spokes 70 that can be readily engaged by the person operating the device. In the drawings I have shown the inner end portion 66 locked or set in the boss by a set screw 71 and I have shown packing means 72 provided between the stem and the extension 67 to prevent leakage between these parts.

The boss 63 is preferably provided with a lubricant fitting 74 through which lubricant can be admitted into the interior of the boss where the gear 61 occurs and since the interior of the boss is in communication with the bore 20 lubricant introduced through the fitting 71 lubricates the various working parts including the thread parts 51 and 52 and the balls 53. The sealing rings 23 and 37 prevent leakage of lubricant from the area just referred to.

In accordance with the present invention a suitable means is provided for locking or keying the sections A and B together so that they are free to move lengthwise relative to each other but do not turn or rotate relative to each other. In the particular case illustrated a projection 80 is provided on or secured to the inner end portion 21 of the body section A to engage between spaced lugs 81 on the flange 22 of clamp section B. The projection 80 and lugs 81 cooperate to positively check or hold the sections A and B against relative rotation while allowing free movement lengthwise under the action of the means D. It is believed from the foregoing description that the operation of the structure described will be fully understood. Assuming the flange 14 of the means F to be coupled to pipe flanges or the like, the structure is included in the pipe line as a fixture or fitting. With the clamp section B in a released position either end of plate C can be positioned in the chamber 11 following which means E may be operated by turning the stem 60 to advance the clamp section B toward the plate until the plate has been clamped tight between the faces 26 and 27. It is to be noted that in the particular case above described the stem 60 projects horizontally from the fitting so that the structure can be operated from one side thereof. However, it will be apparent that the structure may be made with the stem projecting in any desired direction and in the form of the invention about to be described it is shown projecting vertically. It will be noted that through the worm gear 61 engaged with the teeth 62 a substantial leverage is gained over the member 50, which mechanical advantage is increased through the threads 51 and 52 with the result that the stem 60 has a very great leverage or mechanical advantage over the member 50, making it possible with little effort to clamp the section B against the plate C with great force, with the result that the structure may be set to withstand very high pressures. By joining the middle portion of the body section A with the flange 14 on the projecting end portion 13 spreading or springing of the section where the passage 12 occurs is eliminated or minimized making it possible to provide a large fitting and one that will effectively withstand high pressures.

In the form of the invention illustrated in Figs. 6 to 9, inclusive, the body section A' is similar, generally, to the body section above described and the clamp section B' is substantially the same as the clamp section first described. In this form of the invention, however, the outer or projecting end portion 13' of section A', instead of carrying a flange 14 forming means F, is provided with a beveled part 14' for the reception of welding, so that this part of the body may be joined to a pipe or the like by welding.

The body section A' defines a plate chamber 11' for the reception of plate C' and there is a body extension 24' projecting laterally and defining a plate passage 12'. The tie means G in this form of the invention instead of extending from the middle portion of the body to a flange at the outer end of the body is in the nature of a reinforcing rib 33' occurring between the extension 24' and the exterior or outer portion of the part 13'. The ribs 33' which may be of suitable weight and number, effectively brace and reinforce the body portions 13' and 24' and in this form of the invention the ends 31' of the projection 24' are preferably made heavy and are, in effect, continuations of the reinforcements 33'.

The means D' in this form of the invention includes a member 50' threaded to the exterior of the clamp section B' and mounted for rotation in the body section A' by means of rows of balls 53'.

The means E' provided for operating the member 50' includes a stem 60' supported in a boss 63' and operating a gear 61' which meshes with and drives the member 50. In this form of the invention the boss 63' is so located as to support the stem 60' so that the stem is tangential of the boss and projects vertically therefrom. In this form of the invention the extension 67' is shown considerably longer than the extension in the case first described, with the result that the stem 60' is longer than the stem first described and projects a substantial distance above the body. In this form of the invention a lubricant fitting 74' is shown carried at the outer end portion of the extension 67' so that lubricant is provided at the bearing 90 at the outer end of the extension, which bearing supports the outer end portion of the stem 60'. A suitable lubricant fitting 91' is provided on the exterior of the body portion 16' so that lubricant may be admitted into the portion of the body carrying the member 50' in order to lubricate the balls 53', the threads between the member 50 and the clamp member, and the gear 61' and the teeth engaged thereby.

The structure shown in Figs. 1 to 8 may be substantially the same as the structure first described in all particulars other than those noted, and from the foregoing description it will be apparent that the last described form of the invention operates substantially the same as that first described.

Having described only typical preferred forms and applications of my invention, I do not wish to be limited or restricted to the specific details herein set forth, but wish to reserve to myself any variations or modifications that may appear to those skilled in the art and fall within the scope of the following claim.

Having described my invention, I claim:

A fitting of the character described including, a tubular body having a main portion defining a plate chamber transverse of the body and an elongate radially disposed access passage communicating with the chamber and extending to the exterior of the body and having an outer end portion for connection with a pipe, a plate in the chamber, a clamp entered in the inner end of the body to engage the plate and slidably supported in the body, screw means operating the clamp relative to the body including an annular member located entirely within the body and threaded onto the clamp and having gear teeth on its exterior intermediate its end portions, two antifriction bearing means spaced apart at the exterior of the member and located at opposite end portions thereof and supporting the member in the body for rotation relative thereto, and means operating the said member and including, an operating stem carried by the body to project therefrom and a gear on the stem operating said member and engaging the teeth on the said member, the stem being tangential to a circle concentric with the body.

LELAND S. HAMER.

References Cited in the file of this patent

UNITED STATES PATENTS

| Number | Name | Date |
|---|---|---|
| 783,953 | Henry | Feb. 28, 1905 |
| 599,168 | Duncan | Sept. 7, 1926 |
| 2,214,959 | Hamer | Sept. 17, 1940 |
| 2,240,119 | Montgomery | Apr. 29, 1941 |
| 2,242,467 | Hamer | May 20, 1941 |
| 2,278,848 | Hamer | Apr. 7, 1942 |